(12) United States Patent
Seeberg et al.

(10) Patent No.: US 8,122,771 B2
(45) Date of Patent: Feb. 28, 2012

(54) PRESSURE SENSOR UNIT

(75) Inventors: Bjorn Erik Seeberg, Oslo (NO); Paal Martin Vagle, Asker (NO)

(73) Assignee: Presens AS, Oslo (NO)

( * ) Notice: Subject to any disclaimer, the term of this patent is extended or adjusted under 35 U.S.C. 154(b) by 41 days.

(21) Appl. No.: 12/743,005

(22) PCT Filed: Nov. 7, 2008

(86) PCT No.: PCT/NO2008/000395
§ 371 (c)(1),
(2), (4) Date: Jul. 15, 2010

(87) PCT Pub. No.: WO2009/067016
PCT Pub. Date: May 28, 2009

(65) Prior Publication Data
US 2010/0275699 A1 Nov. 4, 2010

(30) Foreign Application Priority Data
Nov. 19, 2007 (NO) .................................. 20075913

(51) Int. Cl.
*G01L 7/08* (2006.01)
(52) U.S. Cl. ........................................................ 73/756
(58) Field of Classification Search ........................ None
See application file for complete search history.

(56) References Cited

U.S. PATENT DOCUMENTS

| 5,095,349 A | * | 3/1992 | Fujii et al. .................... 257/108 |
| 5,320,705 A | * | 6/1994 | Fujii et al. .................... 438/51 |
| 6,218,717 B1 | * | 4/2001 | Toyoda et al. ................ 257/419 |
| 7,293,464 B1 | | 11/2007 | Juan |
| 2006/0201265 A1 | | 9/2006 | Klees et al. |

FOREIGN PATENT DOCUMENTS

| EP | 1400797 A1 | 3/2004 |
| JP | 11132888 A | 5/1999 |
| JP | 11316166 A | 11/1999 |
| WO | 0240957 A1 | 5/2002 |
| WO | 2004097361 A1 | 11/2004 |
| WO | 2007012571 A1 | 2/2007 |

OTHER PUBLICATIONS

PCT/NO2008/000395 International Search Report, Feb. 19, 2009.
Norwegian Application No. 20075913 Search Report, May 30, 2008.

* cited by examiner

*Primary Examiner* — Andre Allen
(74) *Attorney, Agent, or Firm* — Conley Rose, P.C.

(57) ABSTRACT

A pressure sensor unit consists of a shaft part adapted to be introduced in an opening through a pipe wall or chamber wall, and a flange part fastened on the outer end of the shaft part for providing sealing around the outer end of the opening. The shaft part inner end reaches in to engagement with a process fluid which pressure is to be measured. The inner end is provided with perforations for admitting process fluid into the inner room of the shaft part. In the inner room and straight behind the inner end it is arranged a block which constitute a base for a separating membrane for transferal of the process fluid pressure via a hydraulic pipe to a pressure sensor element in the flange part. The flange part is constructed as a thin walled pipe, which is enabled because of internal pressure equalization. Thus great savings is achieved by production of the pressure sensor unit.

5 Claims, 5 Drawing Sheets

PRESSURE SENSOR UNIT

CROSS-REFERENCE TO RELATED APPLICATIONS

This application is a 35 U.S.C. §371 national stage application of PCT Application No. PCT/NO2008/000395, filed 7 Nov. 2008, and entitled Pressure Sensor Unit, hereby incorporated herein by reference, which claims priority to Norway Patent Application No. 2007 5913, filed 19 Nov. 2007, hereby incorporated herein by reference.

STATEMENT REGARDING FEDERALLY-SPONSORED RESEARCH OR DEVELOPMENT

Not applicable.

BACKGROUND AND SUMMARY

The present invention concerns a pressure sensor unit for use preferably in under water plants for transport and processing of hydrocarbon streams, particularly in connection with "Christmas tree devices" on the sea floor. Pressure measurements are necessary on many different points in such plants. The pressure sensor unit according to the invention is still not limited to such use, but can in general be used where a pipe or chamber containing a process fluid, having a hole or an opening through a wall where a pressure sensor unit can be introduced and connected imperviously to the outside of the wall, and such that an inner end of the sensor unit meets the process fluid environment In the attached FIG. 1 it is shown a general example of mounting of a general pressure sensor unit 1 through a pipe wall 14, for measurement of pressure in a process fluid 16. It is predrilled a hole 25 through the pipe wall 14, and in the case shown it is in addition arranged a sleeve 15 with receiving flange outermost. The pressure sensor unit 1 is made of two major parts, a flange part 7 and a shaft part 2, such that the shaft part 2 is adapted to the hole 25 in length and diameter, however with diameter clearance such that the shaft part may be introduced in and out without problems. It is however important that the flange part 17 fits tightly against its fitting (the receiving flange of the sleeve), because it may occur great pressure differences between the process fluid environment in the pipe and in the environment on the outside of the pipe (typical sea floor pressures, while the pressure in the pipe reflects the pressure in the hydrocarbon reservoir far below in the underground).

The inner end 6 of the shaft part is shown approximately "flush" with the inner surface of the pipe wall, which is a favourable placement with regard to avoiding unnecessary wear on the shaft part, both from possible mechanical erosion because of the process fluid motion, and from chemical (corroding) effect from the process fluid 16.

The manner of operation is such that the pressure sensor element which is contained in the pressure sensor unit 1, is exposed to the pressure of the process fluid, but via a separating membrane arranged in the inner end 6 of the shaft part and a hydraulic oil between the separating membrane and the pressure sensor element itself. Signal conduction leads from the pressure sensor element and out through the flange part 17, and possibly the flange part contains further electronics for processing of the pressure signal before it is guided out.

Previously known embodiments of such pressure sensor units 1 which are generally shown in FIG. 1, appear from FIGS. 2 and 3.

In FIG. 2 it is shown an embodiment with so called "face mounted sensor element". Here, a sensor element 4 is mounted completely in the inner end 6 of the shaft part, in a sensor chamber 20 almost in one with the room 21 behind the separating membrane 7, i.e. a room in which the membrane can bend inwards. In this embodiment signal conduction 13 is then guided out of the pressure sensor unit 1 thorough an inner, longitudinal boring in the shaft part 2. The inner end of the shaft part 2 is constituted here concretely by a sensor element holder 3, which in the same manner as the wall in the shaft part 2 is made of thick and during special material, typical "Inconel 625" or higher quality.

Sensor element 4 will here also often be used for measuring temperature, since it finds oneself so close to the process fluid itself. Wire 12 is given as temperature signal wire. The sensor element 4 must then of course be able to withstand high temperatures.

A different principle is used in the embodiment which is shown in FIG. 3, namely with so called "withdrawn sensor element" or "remote seal". Here, the pressure of the process fluid is transferred via a separating membrane 7 through a hydraulic pipe 10 and back to the flange part 17, where the pressure sensor element 4 is arranged in a sensor element holder 3 with a sensor chamber 20. An advantage with such a construction is that pressure sensor element 4 then only needs to experience a limited temperature because of cooling from the outer environment, which typically is sea water. The process fluid temperature may often lie considerably above what the pressure sensor element 4 normally can withstand.

It will normally be arranged a particular temperature sensor element 9 in a solid block 8 which constitute a membrane base for the separating membrane 7 at the inner end 6 of the shaft part. The membrane base/block 8 is conically formed behind the separating membrane 7 to provide the necessary room 21 for inwards bending of the membrane. Signal conduction 12 extends from the temperature sensor element 9, parallel with the hydraulic pipe 10, within a longitudinal boring in the shaft part 2. The wall in the shaft part 2 is for that matter correspondingly thick and solid as in the embodiment shown in FIG. 2, and is made of corresponding high quality material. The block/membrane 8 is made of the same sort material.

The hydraulic pipe 10 which transfers the pressure of the process fluid to the sensor chamber 20 and up into the flange part 17, goes through the inner boring in the shaft part, which in principle has the pressure of the outer environment (lower), and the hydraulic pipe 10 must therefore be of solid type to withstand the pressure difference. The pressure difference must also be taken up/endured by the sensor element holder 3 and a pressure port part 5 which the sensor element holder and the hydraulic pipe is attached to.

Previously prior art in this area with pressure sensor units, is represented moreover by what is known from the publications WO 2004/097361, WO 02/40957, EP 1128172 and US 2006/0201265. The first mentioned publication, WO 2004/097361, shows a pressure sensor unit for exterior mounting, i.e. with a shaft part which exists on the outside of the wall which delimits the pipe or the chamber with process fluid, and then with a flange part existing inside of the shaft part, i.e. the opposite of the technique which is described in FIGS. 1, 2 and 3 and on which the present invention is based. The publication shows however a centrally arranged hydraulic pipe which transfers the pressure of the process fluid from a separating membrane through a sensor chamber with a pressure sensor element, and which exhibits temperature measurements.

From WO 02/40957 it is know a pressure sensor unit with a somewhat different construction. Here it is also found a separating membrane and a hydraulic pipe which transfers a process fluid pressure to a pressure sensor element. Besides, there seems to exist an arrangement to equalize pressure in the internal hydraulic oil. The pressure sensor unit does not have a flange part and a shaft part arranged as in the closest prior art which is shown in FIGS. 2 and 3.

EP 1128172 also exhibits a pressure sensor unit with a separating membrane and hydraulic pipe to an inner chamber with pressure sensor element, but neither this pressure sensor unit has a design adapted to the use which is relevant for the present invention.

US 2006/0201265 shows some pressure sensor constructions, among these one with a flange part and a shaft part mainly corresponding to the construction which is of interest in the present invention. But the shaft part does not comprise any separating membrane and interior hydraulic pipe. The publication does actually concern sterilizable bushings for use with measurement devices.

A problem with the previously known sensor units of the type shown in FIGS. 2 and 3, is that they are expensive. The material price is a great part of the production cost. The customers demand materials which are extremely resistance against corrosion. Often it is specified (as mentioned earlier) "Inconel 625" or higher quality. Such materials have in themselves a high price, and are also expensive to machine.

To achieve lower consumption of high cost material the present invention therefore suggests reducing the thickness of the shaft part wall. It is possible to go down in wall thickness if one let process fluid into the inner room of the shaft part. Therefore, it is provided according to the present invention a pressure sensor unit as precisely defined in the appended patent claim 1. The special about the pressure sensor unit according to the invention, is that the shaft part inner end is provided with perforations to let process fluid into the inner room of the shaft part, and that the separating membrane is arranged on a block suspended in the inner room of the shaft part immediately behind the perforations.

Preferable and favourable embodiments of the pressure sensor unit according to the invention, appear from the dependent patent claims 2-5.

DESCRIPTION OF THE DRAWINGS

To further enlighten the invention, it shall in the following example embodiments be explained in detail, and it is in this connection referred to the appended drawings, of which.

DETAILED DESCRIPTION OF THE EMBODIMENTS

Figure 4:
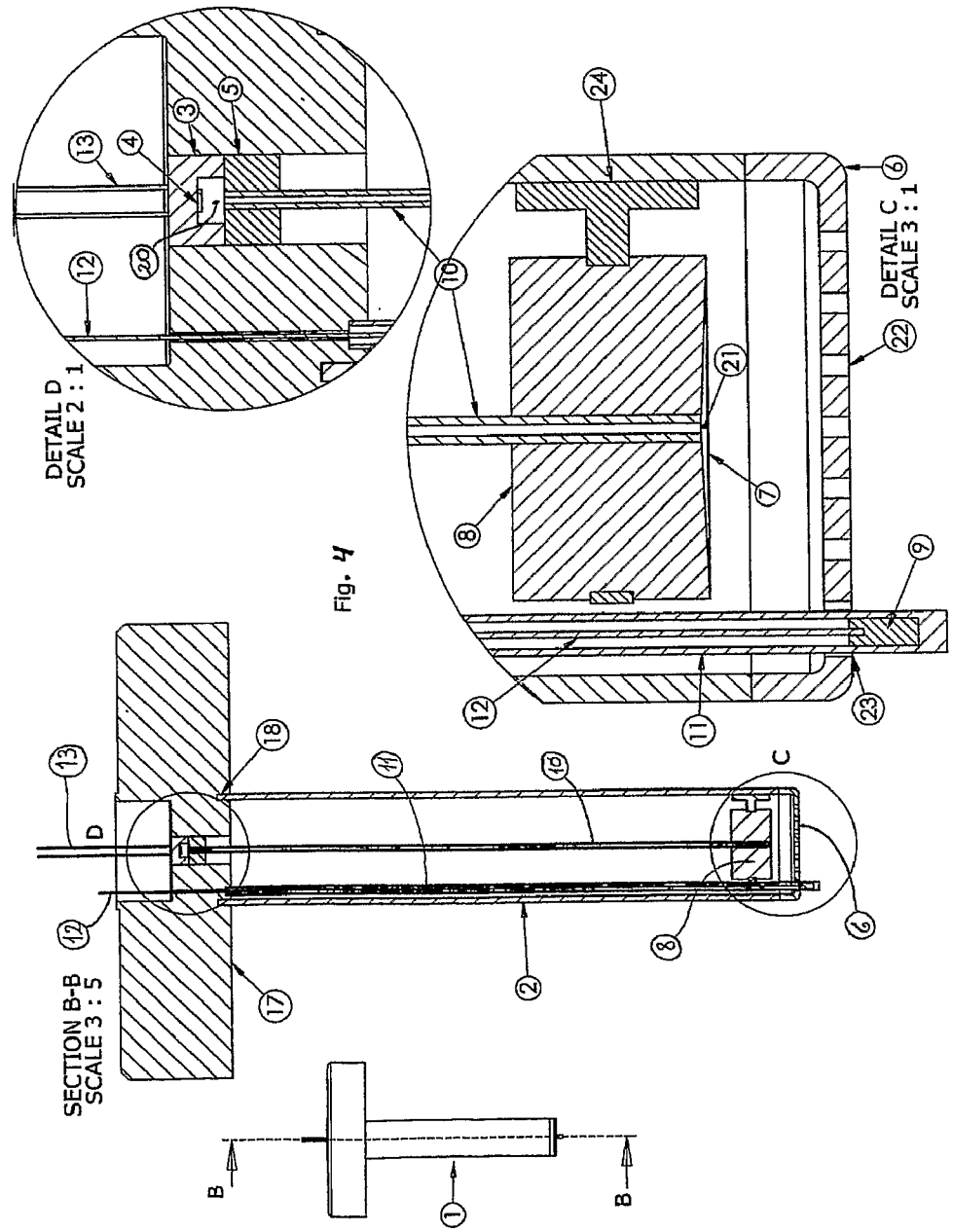
FIG. 4 shows a preferred embodiment of the pressure sensor unit according to the present invention.

In FIG. 4 it is used, as far as possible, the same reference numerals for the same figure elements which already are shown in the previous figures. Thus, farmost to the left in FIG. 1, it can be seen a simple overview sketch of the pressure sensor unit 1 and it is indicated a plane of section B-B through a longitudinal axis through the shaft part 2 and flange part 17. The section is shown enlarged to the right of the little sketch.

Figure 3:
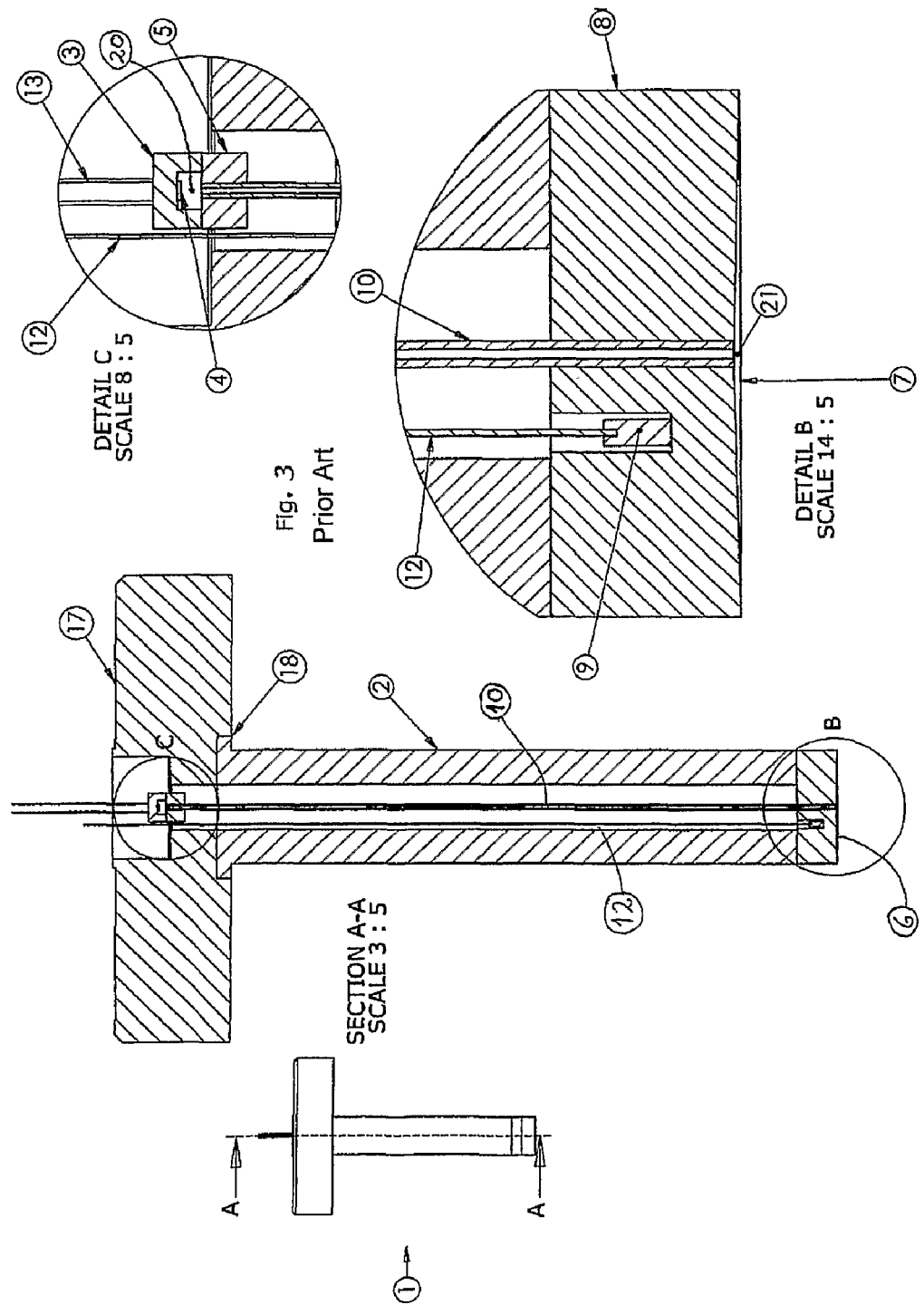
FIG. 3 shows a more closely related pressure sensor unit of known type, with drawn sensor element, but still with thick walled shaft part, mentioned in the above.

In a similar manner as in FIG. 3 a hydraulic pipe 10 is retrieved which transfers pressure with a hydraulic oil to a sensor chamber 20 where a pressure sensor element 4 exists. Also in the present case pressure is transferred from a membrane room 21 behind a separating membrane 7 meeting the process fluid 16, but the difference is that the separating membrane 7 is mounted on an own block or membrane base 8 which now confines itself within the inner room in the shaft part 7. This block 8 is held in place just behind the inner end 6 of the shaft part, and this inner end 6 itself is provided with perforations or holes 22 so that process fluid shall enter the inner room of the shaft part.

By the admittance of process fluid, the shaft part wall does not need to have any particular thickness, and one can save a lot of expensive material. Thus, it is so that it is often desirable from the customers' side with different length of the shaft part, from project to project. It is therefore a great cost saving that just the shaft part 2 can be made of a thin walled pipe, instead of a massive bar where in the prior art one drills out a relatively thin hole. It is instead possible to acquire such thin walled pipes by meter, and then cut to appropriate length in a simple operation.

In detail sketch C in FIG. 4, the solution appears according to the example embodiment more precisely. Here it is shown a temperature sensor element 9 which is surrounded by an all-welded pipe 11 which also guides the signal conductor 12 back into the flange part 17. The pipe 11 must also be corrosion and pressure durable.

On the other hand, the hydraulic pipe 10 need now not be particularly strong, since the pressure within and outside of the pipe 10 is about the same. The hydraulic pipe 10 must however be made of a material which is corrosion resistant, since it is surrounded by a process fluid.

The membrane base/block 8 is held in place by a fastening device 24 on the shaft part in a wall.

In a favourable embodiment the shaft part inner end is performed by a special closing part 6 which comprises the perforations 22, and which is fastened "end-to-end" to the thin walled pipe which comprises the main part of the shaft part, by welding or other suitable fastening method.

Figure 2:
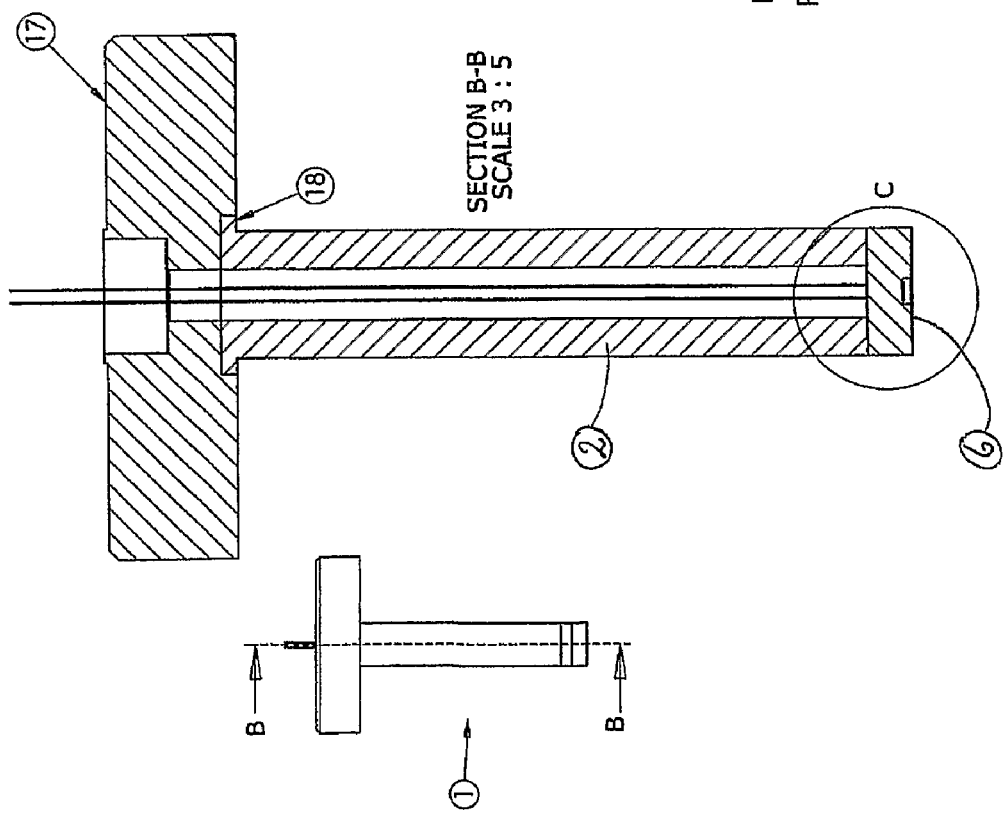
FIG. 2 shows a related pressure sensor unit of known type, with front mounted sensor element and thick walled shaft part, already mentioned.

In detail sketch D, the solution appears according to the shown example embodiment at the top, i.e. in the flange part 17. Lead through for temperature signal conductor 12 is shown, and the signal conductor 13 from the pressure sensor element 4 is also shown (although not completely through to element 4, but it is of course such in reality). About in the same manner as in FIG. 2, the sensor element 4 is arranged in a sensor chamber 20 where the hydraulic pipe 10 ends. The sensor chamber 20 is bored in a sensor element holder 3 which is again connected to a pressure port 5, and both pressure port 5 and element holder 3 is pressure tight fastened to the surrounding flange part 17.

When the pressure element according to the invention is used, the process fluid and its pressure are admitted longer up against the flange part 17 than in the previous known sensor units. It is therefore important that the flange part 17 seals well, and that all passages/bushings and joinings in this are pressure safe. Normally, it will for example be used a metal packing between the flange part 17 itself and its opposite fitting part, see the flange on the sleeve 15 in FIG. 1. The flanges are clamped together by a number of bolts.

Figure 5:
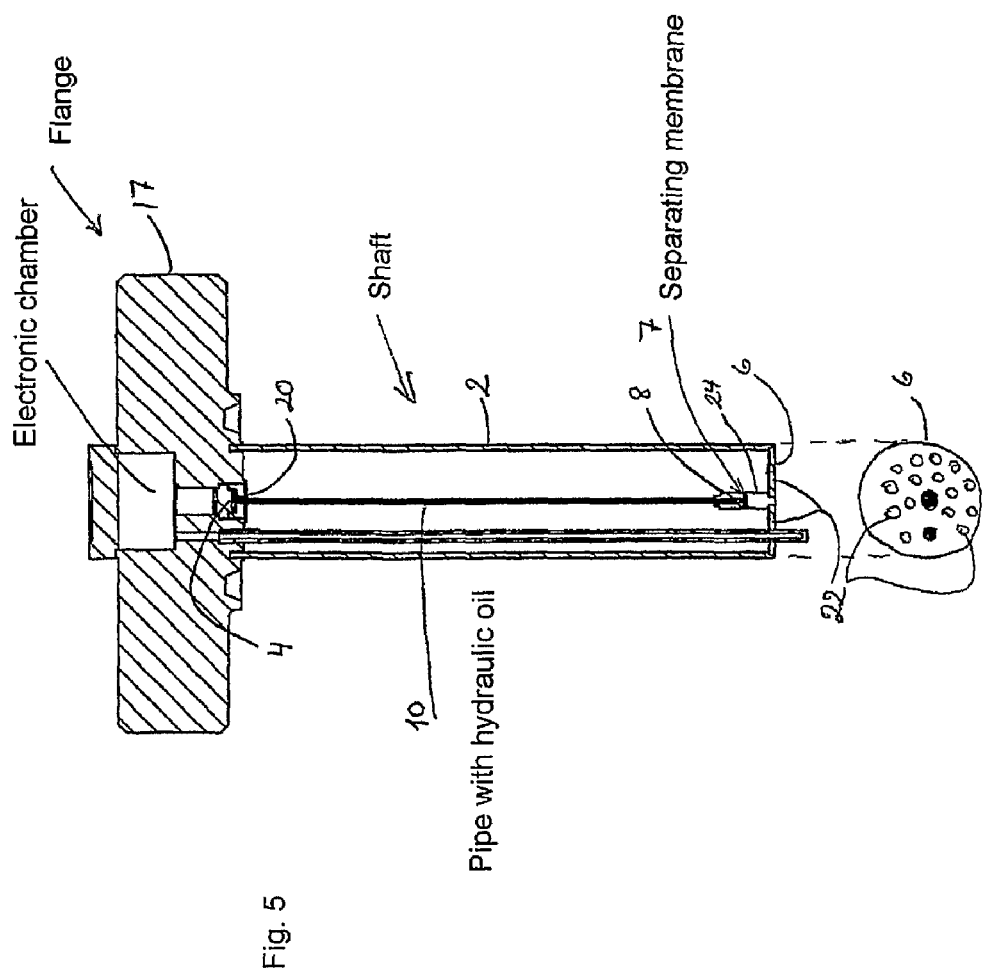
FIG. 5 shows an alternative embodiment of the pressure sensor unit according to the present invention.

In the embodiment shown the membrane base/block 8 is fastened with a fastening device 24 to the shaft part, i.e. the inner wall of the thin pipe. It is however alternatively possible to fasten the block 8 to the closing part 6, or more generally to the rear sides of the inner end 6, as it is shown in FIG. 5, which for that matter is self-explainable with an alternative embodiment with such fastening of block 8. The separating membrane 7 then becomes quite small.

Figure 1:
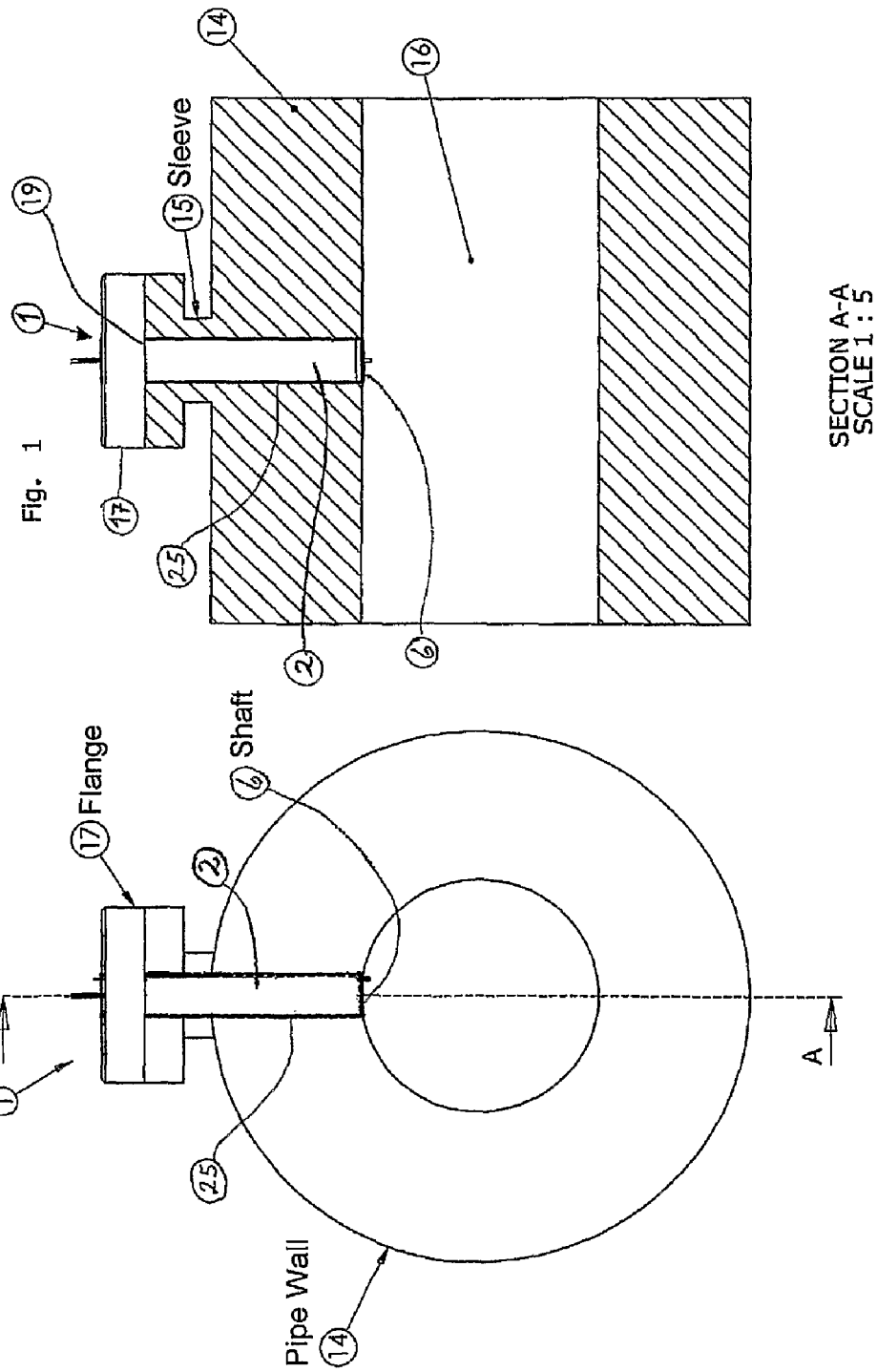
FIG. 1 shows an overview of the mounting method for the pressure sensor unit of the type according to the invention, and which is mentioned above.

In the general FIG. 1 it is shown mounting of the pressure sensor unit 1 down through a sleeve 15 with flange part on top. Often however, a sensor unit 1 is mounted directly into a hole in a block. It is then machined a seat for metal packing and outer flange part on the block, and it is made threaded holes around the hole for fastening by screwing of the sensor units.

Finally, it shall be mentioned that the advantage which is achieved by the present invention, is of economic type, while the technical performance remains unchanged. But one achieves lower material consumption and less working through the present invention, which may be called a pressure sensor unit with pressure compensated shaft. In other words: by admitting the process fluid in the shaft part through perforations, the shaft part wall may be thin, and this provides the desired cost saving.

The invention claimed is:

1. Pressure sensor unit for mounting in an opening through a pipe wall or chamber wall for measuring pressure in a process fluid in the pipe/chamber, which pressure sensor unit comprises:
    a shaft part which protrudes through the opening and has an inner end protruding into the process fluid,
    a flange part fastened on the outer end on the shaft part for providing sealing against the outer end of the opening,
    a pressure sensor element arranged in a sensor chamber in the flange part, and
    a hydraulic pipe mainly arranged along the length of the shaft part between the sensor chamber and a membrane room behind a separating membrane which transfers the process fluid pressure to a hydraulic fluid in the hydraulic pipe, which separating membrane is arranged at the shaft part inner end,
    characterized in that the shaft part inner end is provided with perforations for admitting process fluid into the inner room of the shaft part, and that separating membrane is arranged on a block suspended in the inner room of the shaft part immediately behind the perforations.

2. Pressure sensor unit according to claim 1, characterized in that the shaft part inner end comprises a particular closing part with the perforations, fastened on a thin walled pipe which constitutes the rest of the shaft part.

3. Pressure sensor unit according to claim 1, characterized in that the hydraulic pipe is made of corrosion resistant material for enduring contact with the process fluid.

4. Pressure sensor unit according to claim 1, characterized in that the inner end of the shaft part also comprises a hole for lead through of a temperature sensor element protruding somewhat further into the process fluid.

5. Pressure sensor unit according to claim 4, characterized in that a particular pipe in the inner room of the shaft part encloses a signal conductor extending from the flange part and forward to the temperature sensor element.

\* \* \* \* \*